United States Patent [19]

Sugita et al.

[11] Patent Number: 5,054,340

[45] Date of Patent: Oct. 8, 1991

[54] APPARATUS FOR MACHINING A NON-CIRCULAR WORKPIECE

[75] Inventors: Kazuhiko Sugita, Anjo; Norio Sakakibara, Kariya; Nobumitsu Hori, Ichinomiya; Yoichi Yamakawa, Kariya, all of Japan

[73] Assignee: Toyoda Koki Kabushiki Kaisha, Kariya, Japan

[21] Appl. No.: 471,392

[22] Filed: Jan. 29, 1990

[30] Foreign Application Priority Data

Jan. 30, 1989 [JP] Japan .................................. 1-22185

[51] Int. Cl.⁵ ............................................ B23B 03/28
[52] U.S. Cl. .......................................... 82/18; 82/118; 82/137; 82/904
[58] Field of Search ................... 82/18, 118, 123, 132, 82/133, 134, 904, 137

[56] References Cited

U.S. PATENT DOCUMENTS

| | | | |
|---|---|---|---|
| 4,203,062 | 5/1980 | Bathen | 82/137 |
| 4,366,543 | 12/1982 | Feller et al. | 82/18 |
| 4,564,914 | 1/1986 | Ballough et al. | 82/18 |
| 4,646,595 | 3/1987 | Slee | 82/118 |
| 4,745,832 | 5/1988 | Kubik | 82/123 |

FOREIGN PATENT DOCUMENTS

| | | |
|---|---|---|
| 0043741 | 5/1981 | European Pat. Off. |
| 0232425 | 7/1986 | European Pat. Off. |
| 0140544 | 3/1980 | Fed. Rep. of Germany .......... 82/18 |
| 3215394 | 9/1983 | Fed. Rep. of Germany . |
| 2142860 | 1/1985 | United Kingdom . |

Primary Examiner—Frederick R. Schmidt
Assistant Examiner—Lawrence Cruz
Attorney, Agent, or Firm—Oblon, Spivak, McClelland, Maier & Neustadt

[57] ABSTRACT

An apparatus which moves a tool back and forth in synchronism with rotation of a workpiece with respect to the workpiece to machine the workpiece into a non-circular shape. The tool is attached to a tool mount placed on a tool mount table which is connected to be moved in a direction perpendicular to the axis of a spindle by a motor. The tool is connected to be moved in a direction perpendicular to the axis of the spindle with respect to the tool mount by a high speed actuator. Profile generating movement of the tool is thus provided by a combination of movement provided by the motor and movement provided by the high speed actuator. The high speed actuator is controlled in accordance with high frequency components included in profile data while the motor is driven in accordance with low frequency components included in the profile data. As a result, the responsiveness in profile generating movement of the tool is improved, and high speed machining of a non-circular workpiece is enabled.

7 Claims, 14 Drawing Sheets

APPARATUS FOR MACHINING A NON-CIRCULAR WORKPIECE

BACKGROUND OF THE INVENTION

This invention relates to an apparatus for machining a non-circular workpiece.

Apparatus for machining a non-circular workpiece with a numerically controlled machine are already known wherein a linear motor is used for feeding a cutting tool in a direction perpendicular to the axis of a spindle, and an exemplary one of such apparatus is disclosed, for example, in U.S. Pat. No. 4,653,360. In the apparatus, the position of a cutting tool in a direction perpendicular to the axis of a spindle is feedback controlled at a high speed in a synchronized relationship with an angle of rotation of the spindle by means of a linear motor.

One of articles to be machined into a non-circular shape is, for example, a piston for use with an internal combustion engine. FIGS. 14A and 14B are a top plan view and a front elevational view of an exemplary one of conventional pistons, respectively. The piston shown is worked in the following manner. At first, a cylindrical workpiece is attached to a spindle of a non-circular workpiece machining controlling apparatus and then turned by the latter. Then, a cutting tool is controlled to move back and forth in a synchronized relationship with an angle of rotation of the workpiece so that the workpiece may be machined into an elliptic shape having such a major diameter and a minor diameter as seen in FIG. 14A. The value of (major diameter—minor diameter)/2 is several hundreds μm or so. Since the sectional shape of the piston has a period of 180 degrees, the cutting tool is reciprocated twice for each rotation of the spindle. The fundamental frequency of back and forth movement of the cutting tool is about 100 Hz because such machining is performed at a speed of rotation of the spindle of about 3,000 rpm from the point of view of the machining efficiency, machining accuracy and so forth. Further, taking it into consideration that harmonic components are included in the sectional shape of the piston, the back and forth movement of the cutting tool includes, in addition to the fundamental wave of about 100 Hz, a second harmonic of 200 Hz, a third harmonic of 300 Hz and similar n-th harmonics of n×100 Hz. At the technical level at present, with regard to machining accuracy required, the back and forth movement of the cutting tool must necessarily respond at least to a seventh harmonic in order that the deviation of the sectional shape of the piston from a required finished sectional shape may remain within a required tolerance.

However, it is difficult for a linear motor to be driven to move forwardly and backwardly in response to the seventh harmonic equal to about 700 Hz. Consequently, high speed machining which satisfies a degree of machining accuracy required at present can not be attained.

SUMMARY OF THE INVENTION

Accordingly, it is an object of the present invention to provide an apparatus for machining a non-circular workpiece with which a non-circular workpiece can be machined with a high degree of accuracy at a high speed.

According to the non-circular workpiece machining apparatus, a tool mount to which a tool is to be attached is placed on a tool mount table. The tool mount table is moved in a direction perpendicular to an axis of a spindle by means of a motor. Meanwhile, a tool mounted on the tool mount is moved in a direction perpendicular to the axis of the spindle with respect to the tool mount by means of a high speed actuator. The position of the tool mount table is controlled in accordance with profile data in a synchronized relationship with rotation of the spindle by a motor driving means. Meanwhile, the position of the tool with respect to the tool mount is controlled in accordance with the profile data in a synchronized relationship with rotation of the spindle by a high speed actuator driving means. As a result, the movement of the tool is provided as a combination of the movement of the tool provided by the motor and the movement of the tool provided by the high speed actuator.

Then, the motor is driven, with regard to an angle of rotation of the spindle, with low frequency components of the profile data which define a relative position of the tool in the direction perpendicular to the axis of the spindle while the high speed actuator is driven with high frequency components of the profile data. In other word, in profile generating movement, low speed movement for a comparatively great displacement is controlled by the motor while high speed movement for a comparatively small displacement is controlled by the high speed actuator. Consequently, the responsibility in movement of the tool is improved, and a non-circular workpiece can be machined with a high degree of accuracy at a high speed.

BRIEF DESCRIPTION OF THE DRAWINGS

FIG. 11 is an illustration showing NC data provided to the CPU of FIG. 2;

DESCRIPTION OF THE INVENTION

Figure 2:
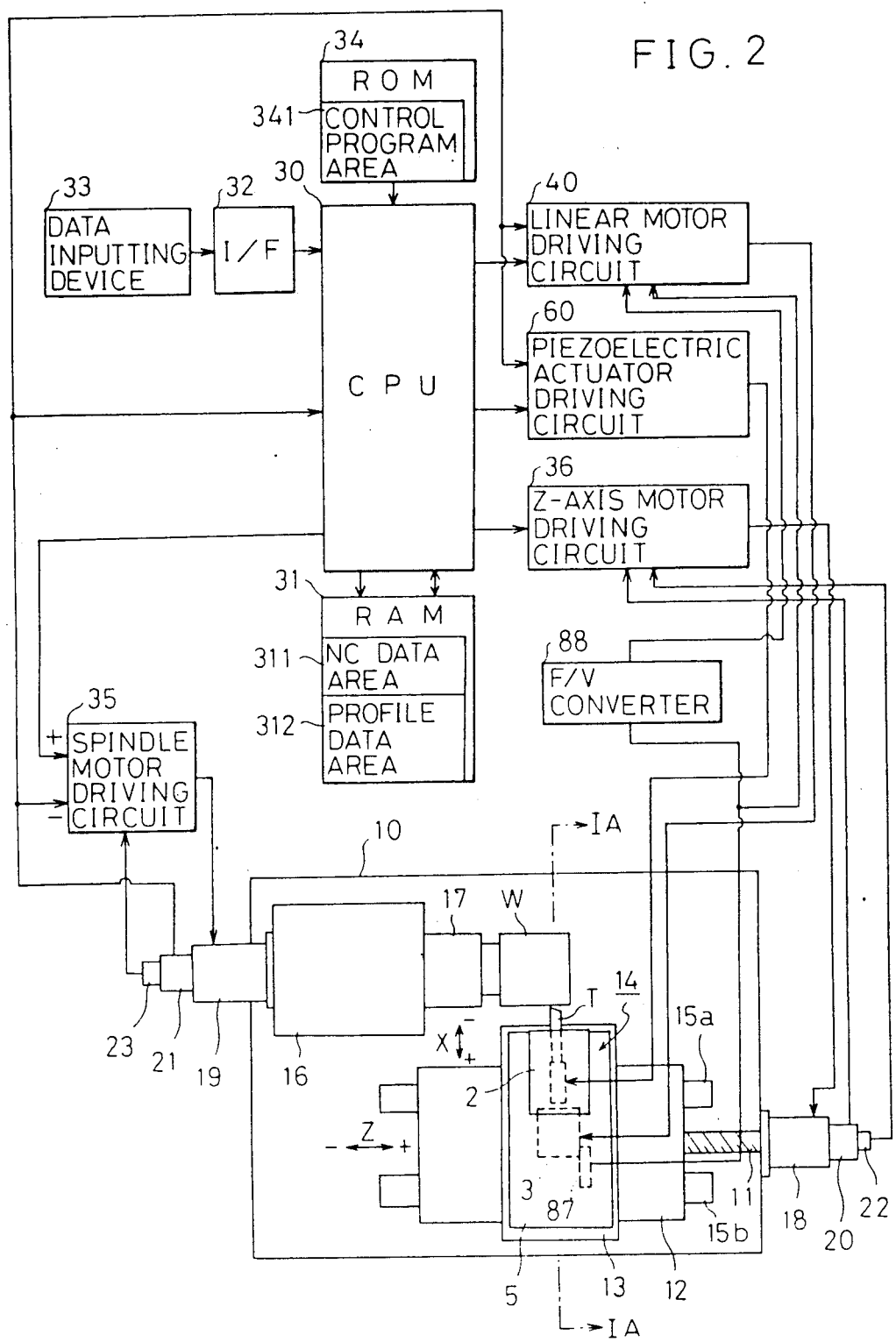
FIG. 2 is a diagrammatic representation showing an entire construction of the non-circular workpiece machining apparatus.

Referring first to FIG. 2, there is shown a mechanical construction of a non-circular workpiece machining apparatus according to a preferred embodiment of the present invention. The non-circular workpiece machining apparatus shown includes a bed 10 and a pair of slide rails 15a and 15b disposed on the bed 10 and extending in the direction of a Z-axis. A tool slide 12 is disposed for sliding movement in the Z-axis direction on the slide rails 15a and 15b and connected to be driven to move by a Z-axis motor 18 in the form of a servomotor by way of a feed screw mechanism 11. A tool base 13 is placed on the tool slide 12, and a cutting tool T and an X-axis tool feeding mechanism 14 are placed on the tool base 13. The cutting tool T is moved back and forth in the X-axis direction by the tool feeding mechanism 14 which will be hereinafter described. An amount of rotation of the Z-axis motor 18 is detected by a rotary encoder 20, and a detection signal of the rotary encoder 20 is fed back as a position feedback signal to a Z-axis motor driving circuit 36. Meanwhile, a speed of rotation of the Z-axis motor 18 is detected by a tachometer generator 22, and a detection signal of the tachometer generator 22 is fed back as a speed feedback signal to the Z-axis motor driving circuit 36.

A head-stock 16 is disposed on the bed 10, and a spindle 17 is supported for rotation on the head-stock 16. The spindle 17 is connected to be rotated by a spindle motor 19 in the form of a servomotor. A workpiece W such as a piston for an engine is attached to the spindle 17 by means of a chuck not shown and fitted on a positioning pin not shown which extends from the spindle 17. As a result, the phase of rotation of the workpiece W coincides with the phase of rotation of the spindle 17. An amount of rotation of the spindle motor 19 is detected by a rotary encoder 21, and a detection signal of the rotary encoder 21 is fed back as a position feedback signal to a spindle motor driving circuit 35. Meanwhile, a speed of rotation of the spindle motor 19 is detected by a tachometer generator 23, and a detection signal of the tachometer generator 23 is fed back as a speed feedback signal to the spindle motor driving circuit 35.

With the apparatus, when the spindle 17 is rotated, the cutting tool T is moved back and forth in the X-axis direction in a synchronized relationship with rotation of the spindle 17 so that the workpiece W may be machined so as to have a predetermined substantially elliptic cross section. In a combined or overlapping relationship with the machining movement, the tool slide 12 is fed in the Z-axis direction by the Z-axis motor 18 so that the workpiece W may be machined also in the Z-axis direction. Consequently, the workpiece W is machined into a desired cylindrical shape.

Figure 1A:
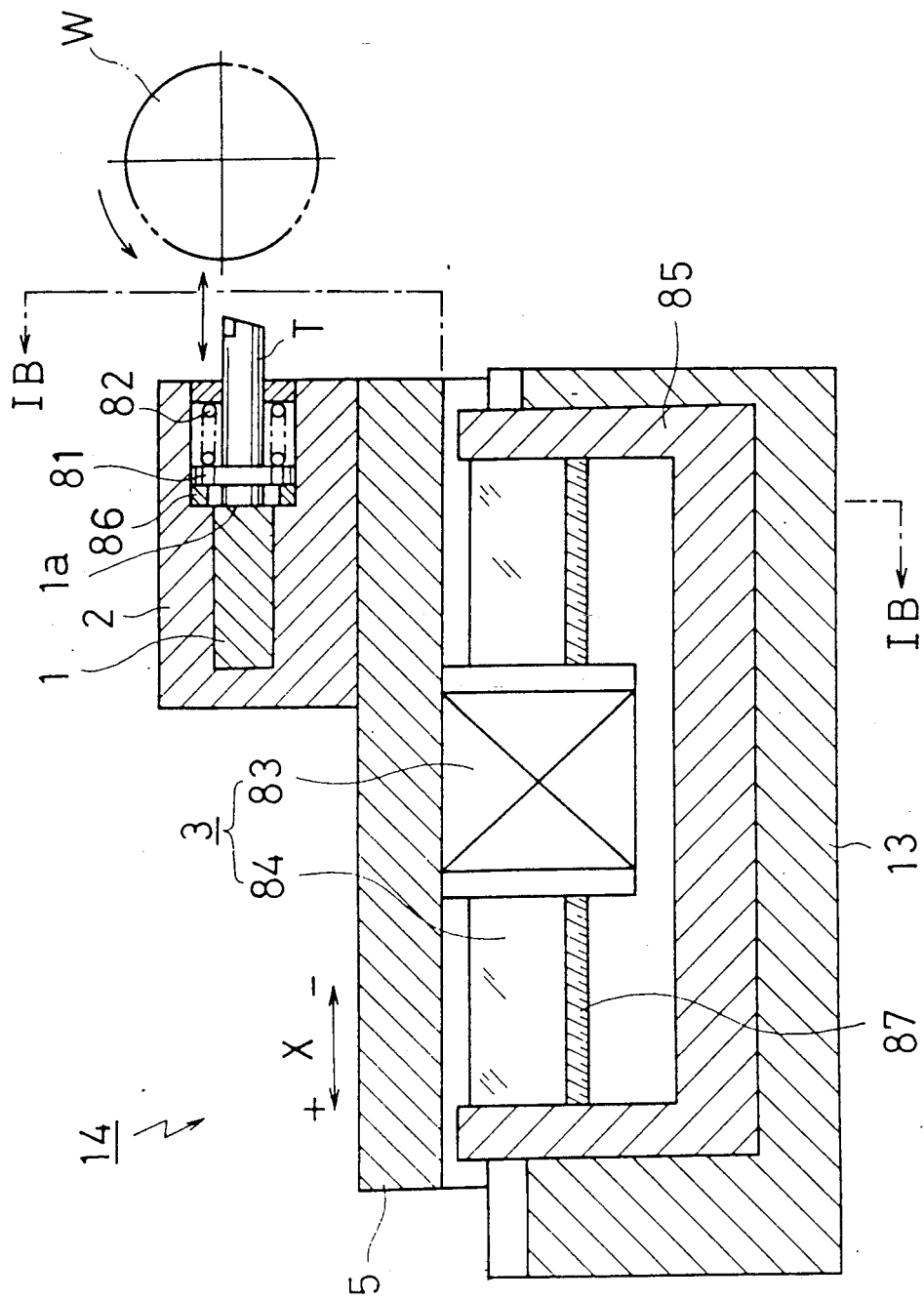
FIGS. 1A and 1B are sectional views showing an X-axis tool feeding mechanism of a non-circular workpiece machining apparatus according to a preferred embodiment of the present invention.
Figure 1B:
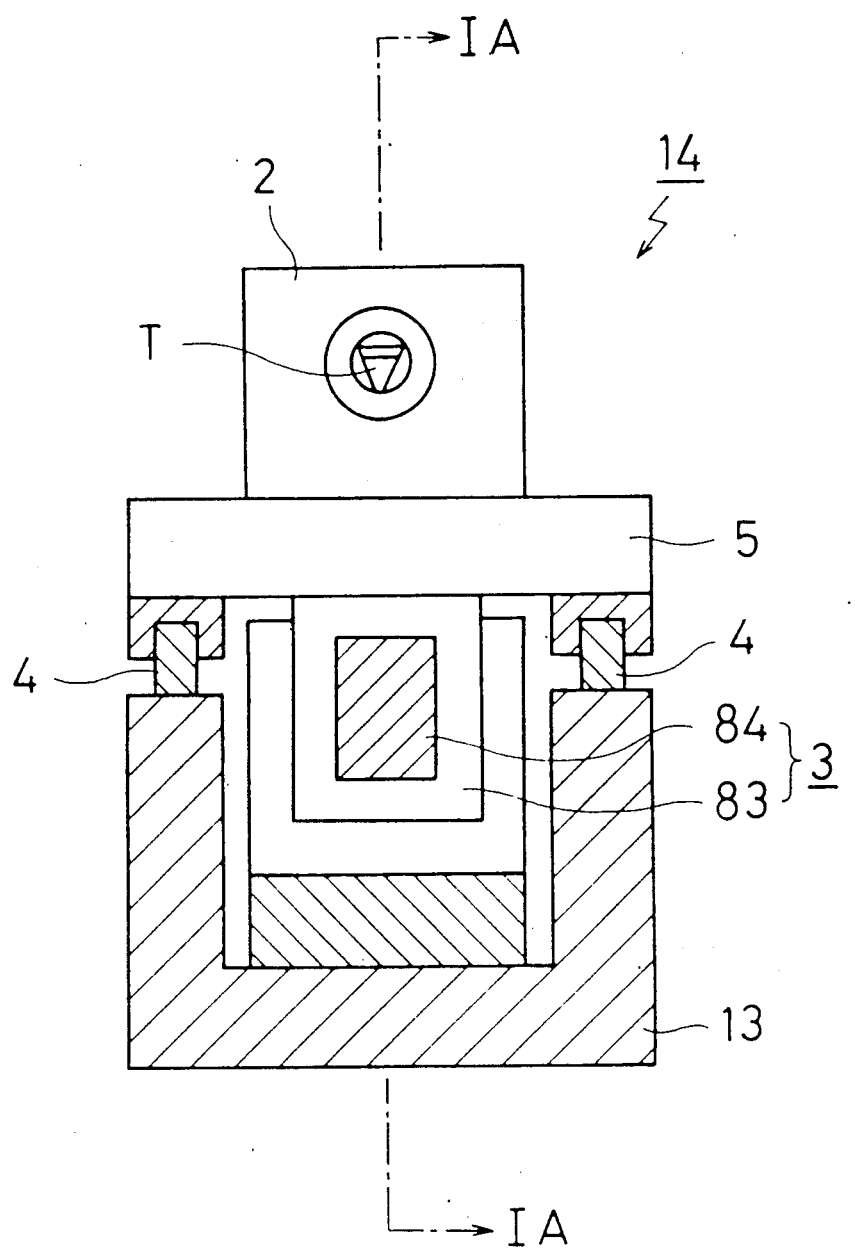
Figure 3:
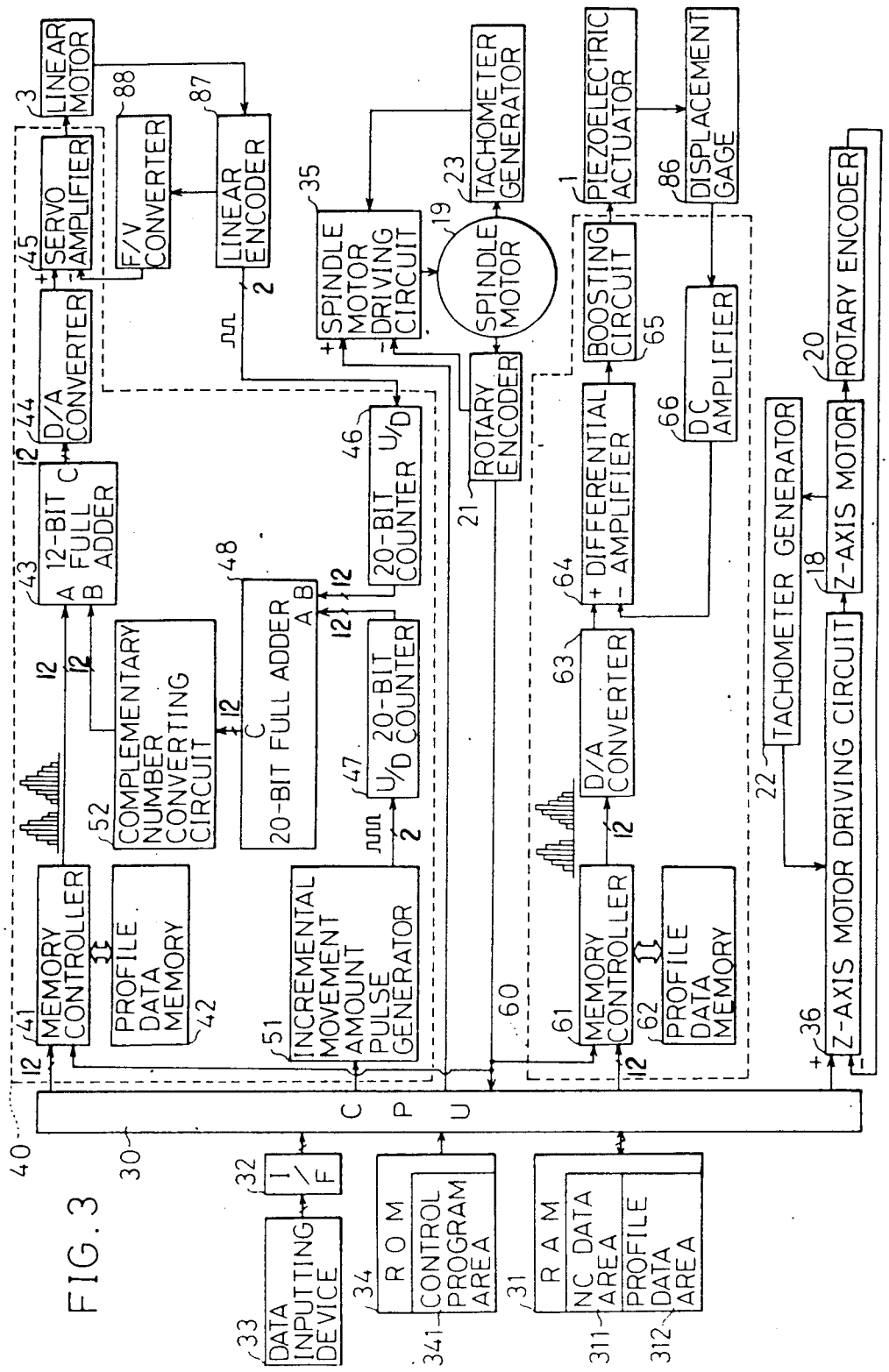
FIG. 3 is a block diagram showing an electric construction of the apparatus shown in FIG. 2.

The X-axis tool feeding mechanism 14 is shown in detail in FIGS. 1A and 1B which are sectional views thereof taken in directions parallel and perpendicular to the X-axis, respectively. Referring to FIGS. 1A and 1B, the cutting tool T is mounted on a tool mount 2. A piezoelectric actuator 1 made of PZT (lead zirconate titanate) is disposed in the inside of the tool mount 2. A holder 81 for the cutting tool T is normally held in contact at an end face thereof with an end face 1a of the piezoelectric actuator 1 under the biasing force exerted by a compression coil spring 82. When a voltage is applied to the piezoelectric actuator 1, the end face 1a of the piezoelectric actuator 1 is displaced by an amount corresponding to the magnitude of the voltage applied thereto in the direction indicated by an arrow mark —of the X axis direction against the biasing force of the coil spring 82. As a result, the position of the cutting tool T in the X-axis direction with respect to the tool mount 2 is controlled in accordance with the magnitude of the voltage applied to the piezoelectric actuator 1. The amount of displacement of the piezoelectric actuator 1 with respect to the tool mount 2 is detected by an eddy current displacement gage 86 provided in the tool mount 2. A signal detected by the displacement gage 86 is transmitted as a position feedback signal to a piezoelectric actuator driving circuit 60 (FIG. 3).

The tool mount 2 is securely mounted on a tool mount table 5. The tool mount table 5 is disposed for sliding movement in the X-axis direction with respect to the tool base 13 under the guidance of a pair of linear guides 4 provided on the opposite sides along the length of the tool base 13. An armature 83 of the linear motor 3 is securely mounted on a lower face of the tool mount table 5. A stator 84 extends in the X-axis direction through the armature 83 and is supported at the opposite ends thereof on the tool base 13 by means of a holding member 85. When the armature 83 and the stator 84 are energized, an electromagnetic force is generated between the armature 83 and the stator 84 so that the armature 83 is moved in the X-axis direction with respect to the stator 84. Upon such movement of the armature 83, the tool mount table 5 is slidably moved in the X-axis direction with respect to the tool base 13. The amount and speed of the movement of the tool mount table 5 in the X-axis direction with respect to the tool base 13 are detected by a linear encoder 87 and a frequency to voltage (F/V) converter 88 (FIG. 3) for converting an output of the linear encoder 87 from a frequency into a voltage. A signal detected by the linear encoder 87 is transmitted as a position feedback signal while a signal detected by the F/V converter 88 is transmitted as a speed feedback signal to a linear motor driving circuit 40 (FIG. 3).

Figure 4:
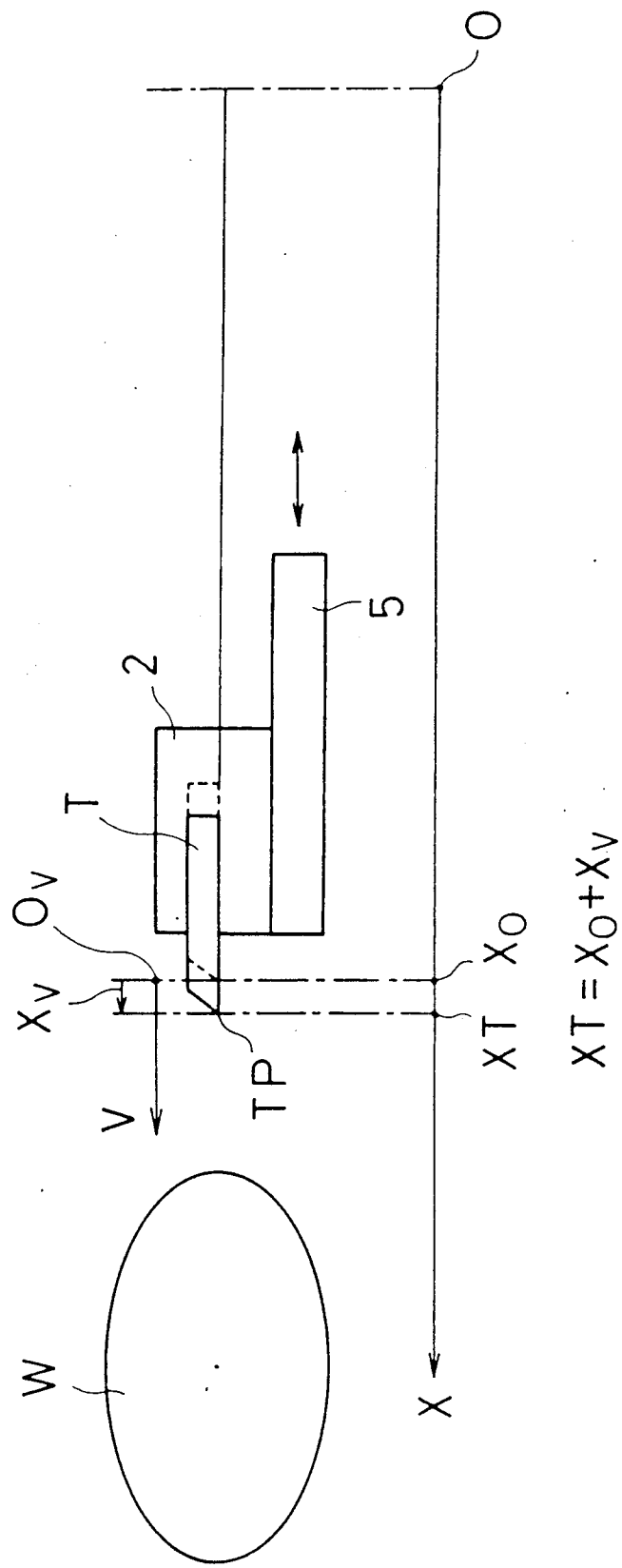
FIGS. 4 and 5 are diagrams illustrating movement of a tool.

Referring now to FIG. 4, the absolute position of the cutting tool T is represented by the position XT on the X-axis of an end TP of the tool T fixed to the bed 10. Meanwhile, the position of the tool end TP which is projected by a predetermined reference length with respect to the tool mount 2 is defined as the origin (hereinafter referred to as tool origin) Ov, and a coordinate system Ov-V having an axis V parallel to the X-axis (the coordinate system will be hereinafter referred to as tool coordinate) is fixed on the tool mount 2. The position of the tool origin Ov on the X-axis (hereinafter referred to as tool origin position) is represented by Xo while the position of the tool end TP indicated on the tool coordinate Ov-V (hereinafter referred to as relative end position) is represented by Xv. Using Xo and Xv, XT is calculated in accordance with the following equation:

$$XT = Xo - Xv \tag{1}$$

It is to be noted that the tool origin position Xo is controlled by the linear motor 3 while the relative end position Xv is controlled by the piezoelectric actuator 1.

Referring now to FIGS. 2 and 3, an electric construction of the non-circular workpiece machining apparatus is shown. The non-circular workpiece machining apparatus includes a central processing unit (hereinafter referred to as "CPU") 30, and a ROM 34 and a RAM 31 both connected to the CPU 30. The ROM 34 has formed therein a control program area 341 in which a control program for controlling the non-circular workpiece machining apparatus is stored in advance while the RAM 31 has formed therein an NC data area 311 for storing therein NC data which define a feed mode, a feed amount, a feed speed and so forth of the cutting tool T, and a profile data area 312 for storing therein profile data for moving the cutting tool T back and forth in accordance with an outer profile of a workpiece W.

Figure 5:
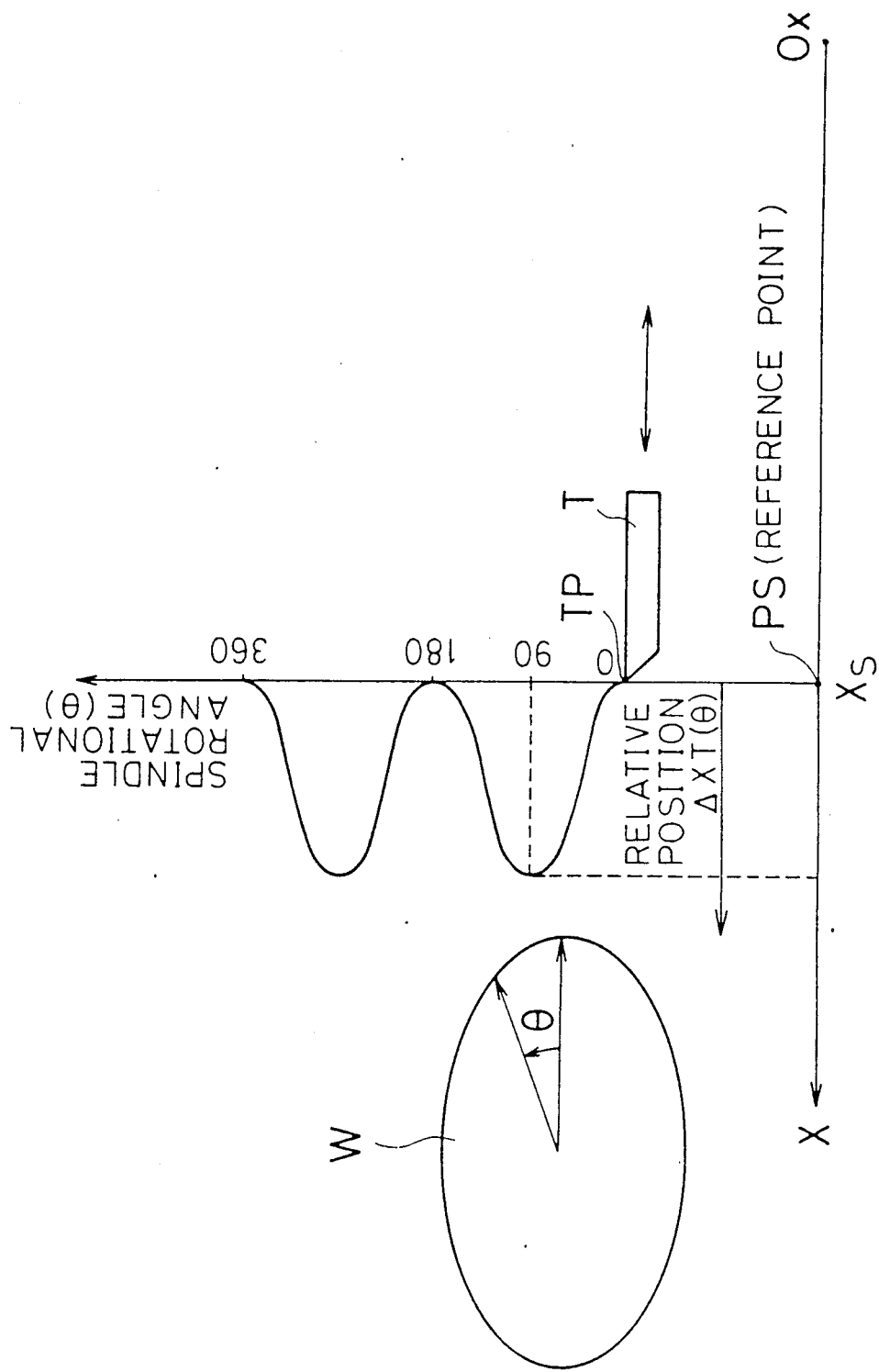

Referring now to FIG. 5, each of such profile data indicates a relative position $\Delta XT(\theta)$ of the tool end TP which varies in a synchronized relationship with an angle $\theta$ of rotation of the spindle 17 with respect to a reference point PS. In particular, a relative position $\Delta XT(\theta)$ of the tool end TP is represented in an equation given below using a movably set position (hereinafter referred to as reference position) Xs of the reference point PS on the X-axis. It is to be noted that the reference position Xs does not vary in a synchronized relationship with rotation of the spindle 17. However, the reference position Xs can vary along the Z axis.

$$\Delta XT(\theta) = XT(\theta) - Xs \quad (2)$$

Here, the reference position Xs is controlled by the linear motor 3 while the relative position $\Delta XT(\theta)$ is controlled by both of the linear motor 3 and the piezoelectric actuator 1.

Accordingly, the relative position $\Delta XT(\theta)$ is decomposed into a component $\Delta XT_L(\theta)$ which is controlled by the linear motor 3 and another component $\Delta XT_P(\theta)$ which is controlled by the piezoelectric actuator 1. In particular, the following equation stands:

$$\Delta XT(\theta) = \Delta XT_L(\theta) + \Delta XT_P(\theta) \quad (3)$$

Further, in case the position of the tool end TP is controlled in a synchronized relationship with rotation of the spindle 17, each of the positions Xo and Xv defined hereinabove makes a function of the angle $\theta$ of rotation, and the equation (1) given hereinabove can be rewritten with a function of into the following equation:

$$XT(\theta) = Xo(\theta) - Xv(\theta) \quad (4)$$

Accordingly, the following equation can be derived from the equations (2) and (4):

$$\Delta XT(\theta) = Xo(\theta) - Xs - Xv(\theta) \quad (5)$$

The following equations can be derived from the equations (3) and (5):

$$\Delta XT_L(\theta) = Xo(\theta) - Xs \quad (6)$$

$$\Delta XT_P(\theta) = Xv(\theta) \quad (7)$$

Thus, each profile data $\Delta XT_L(\theta)$ assigned to the linear motor 3 is represented by a deviation of the tool origin position $Xo(\theta)$ with respect to the reference position Xs. Meanwhile, each profile data $\Delta XT_L(\theta)$ assigned to the piezoelectric actuator 1 is represented by an aforementioned relative end position $Xv(\theta)$.

Referring back to FIGS. 2 and 3, such NC data and profile data as described above are transmitted from a data inputting device 33 into a predetermined area of the RAM 31 by way of an input/output interface 32.

Also connected to the CPU 30 are a linear motor driving circuit 40 for driving the linear motor 3, a piezoelectric actuator driving circuit 60 for driving the piezoelectric actuator 1, a Z-axis motor driving circuit 36 for driving the Z-axis motor 18, and a spindle motor driving circuit 35 for driving the spindle motor 19.

Referring particularly to FIG. 3, a detailed construction of the linear motor driving circuit 40 and the piezoelectric actuator driving circuit 60 is shown. The linear motor driving circuit 40 includes a memory controller 41 connected to the CPU 30 for controlling address designation and data to be inputted to or outputted from a profile data memory 42. Such profile data $\Delta XT_L(\theta)$ assigned to the linear motor 3 as described above are transmitted from the profile data area 312 of the RAM 31 to the profile data memory 42 by way of the CPU 30. Meanwhile, the memory controller 41 receives a synchronization signal which is developed from the rotary encoder 21 each time the spindle motor 19 rotates by a unit angle. Then, each time the spindle 17 is rotated over a predetermined angle (for example, 0.5 degrees), the count value of a built-in address counter is updated. Each time the count value of the address counter is updated, a component $\Delta XT_L(\theta)$ of profile data stored at a corresponding address of the profile data memory 42, that is, at an address corresponding to a current angular position of the spindle 17, is outputted as a parallel signal of 12 bits to a terminal A of a full adder 43 by way of the memory controller 41.

The linear motor driving circuit 40 further includes an incremental movement amount pulse generator 51 also connected to the CPU 30. The pulse generator 51 generates a pulse signal for varying the reference position Xs of the profile generating movement in response to an instruction from the CPU 30. The position of a maximum radius of a workpiece W is selected, for example, as the reference position Xs. Accordingly, if the workpiece W has a barrel-like shape, then the reference position Xs makes a function of the Z-coordinate. The reference position Xs of the profile generating movement can be varied arbitrarily with such pulse signal. Accordingly, the cutting tool T is caused to make profile generating movement with respect to the reference position Xs by the linear motor 3 and the piezoelectric actuator 1, and such profile generating movement can be offset by varying the reference position Xs. In other words, a workpiece can be cut-in by varying the reference position Xs. Also, a similar shape having a different size can be machined. Further, if the reference position Xs is varied in a synchronized relationship with movement in the Z-axis direction, then a workpiece can be machined, for example, into a conical shape having sectional shapes having a fixed profile.

An incremental movement pulse signal developed from the incremental movement amount pulse generator 51 is transmitted to a 20-bit counter 47. The counter 47 decrements the current count value thereof in response to an input pulse corresponding to movement in the positive direction of the X-axis but increments the current count value thereof in response to an input pulse corresponding to movement in the negative direction of the X-axis. Output of the counter 47 is coupled to a terminal A of a 20-bit full adder 48. Thus, an output value of the counter 47 is a 20-bit parallel signal and represents an aimed control position then. Normally, a corresponding number of pulse signals are outputted from the incremental movement amount pulse generator 51 in order to position the tool origin position Xo to the predetermined reference position Xs. The tool origin position Xo coincides with the position of the tool end TP when the relative end position Xv is equal to zero, that is, when the piezoelectric actuator 1 remains at the origin. Then, at a point of time when the outputting of the pulse signal is completed, the output value of the 20-bit counter 47 is held at the reference position Xs.

On the other hand, a feedback pulse signal of the linear encoder 87 for detecting an amount of movement of the linear motor 3 is transmitted to another 20-bit counter 46. The counter 46 increments the current count value thereof in response to an input pulse corresponding to movement in the positive direction of the X-axis but decrements the current count value thereof in response to an input pulse corresponding to movement in the negative direction of the X-axis. Output of the 20-bit counter 46 is coupled to a terminal B of the 20-bit full adder 48. An output value of the 20-bit counter 46 is a 20-bit parallel signal and represents a current position of the tool origin Ov.

Accordingly, a deviation between the aimed control position and the current position is calculated by the 20-bit full adder 48 and is transmitted to a complementary number converting circuit 52 which has a function of inverting each bit of a received signal and adding "1" to the value after such inversion. Output of the complementary number converting circuit 52 is coupled to a terminal B of the full adder 43. Accordingly, a value obtained by subtracting an output of the full adder 48 from a value received at the terminal A is outputted from the full adder 43. Output of the full adder 43 is converted into a voltage value by a digital to analog (D/A) converter 44 and transmitted to a servo amplifier 45. The servo amplifier 45 amplifies a deviation between a voltage value received from the D/A converter 44 and an output voltage of the F/V converter 88, and the linear motor 3 is driven at a speed corresponding to an output of the servo amplifier 45. Since the full adder 43 is included in a position feedback loop, the linear motor 3 is positioned to such a position that the output of the full adder 43 may be equal to zero. In particular, when no profile data $\Delta XT_L(\theta)$ is received from the terminal A of the full adder 43, the tool origin Ov is positioned to the reference position Xs which is a final aimed position to be outputted from the incremental movement amount pulse generator 51.

Then, after the tool position Ov is positioned to the reference position Xs and the output of the full adder 48 is reduced to zero, outputting of profile data $\Delta XT_L(\theta)$ from the profile data memory 42 is instructed by an instruction from the CPU 30. The profile data $\Delta TL_L(\theta)$ are transmitted to the terminal A of the full adder 34 in synchronism with rotation of the spindle 17. Then, the linear motor 3 is driven in accordance with a deviation between the two inputs to the full adder 43. Also then, a feedback pulse is developed from the linear encoder 87, and a current deviation $\Delta X_R(\theta)$ of a current position $X_R(\theta)$ of the tool origin Xo with respect to the reference position Xs is developed from the full adder 48. Output of the full adder 43 is thus equal to $\Delta XT_L(\theta) - \Delta X_R(\theta)$.

Since the current position of the tool origin Ov is controlled by the linear motor 3 so that the output of the full adder 43 may be equal to zero, it is controlled followingly to a position represented by the profile data $\Delta XT_L(\theta)$ after all.

Generally, the output value of the full adder 43 is given by $$\Delta XT_L(\theta) + Xs(\theta) - X_R(\theta) \tag{8}$$

Since the current position of the tool origin Ov is positioned so that the output value of the full adder 43 may be equal to zero, it follows an aimed position given by $\Delta XT_L(\theta) + Xs(\theta)$.

On the other hand, the piezoelectric actuator driving circuit 60 includes a profile data memory 62 connected to the CPU 30 by way of a memory controller 61. Constructions and functions of the memory controller 61 and profile data memory 62 of the piezoelectric actuator driving circuit 60 are similar to those of the memory controller 41 and profile data memory 42 of the linear motor driving circuit 40. The profile data memory 62 has stored therein profile data $\Delta XT_P(\theta)$ each of which represents a relative position of the tool end TP assigned to the piezoelectric actuator 1 with respect to the tool origin position Xo. Profile data $\Delta XT_P(\theta)$ outputted from the profile data memory 62 by way of the memory controller 61 are inputted to a digital to analog (D/A) converter 63 and converted into an analog voltage value by the latter. Output of the D/A converter 63 is coupled to a differential amplifier 64.

An output of a displacement gage 86 for detecting a displacement of the piezoelectric actuator 1 is amplified by a DC amplifier 66 and then transmitted to the differential amplifier 64. An output of the DC amplifier 66 represents a current relative position $XvR(\theta)$ of the tool end TP with respect to the tool origin Ov. Accordingly, an output of the differential amplifier 64 has a value equal to $\Delta XT_P(\theta) - XvR(\theta)$. Such output of the differential amplifier 64 is boosted by a boosting circuit 65 and then applied to the piezoelectric actuator 1. Consequently, the piezoelectric actuator 1 is displaced in accordance with the voltage applied thereto so that the relative position of the tool end TP with respect to the tool origin Ov is varied. Since the differential amplifier 64 forms part of a position feedback loop, the piezoelectric actuator 1 is displaced so that the output of the differential amplifier 64 may be equal to zero. Accordingly, the current relative position $XvR(\theta)$ of the tool end TP with respect to the tool origin Ov follows an instructed value of the profile data $\Delta XT_P(\theta)$.

Figure 6:
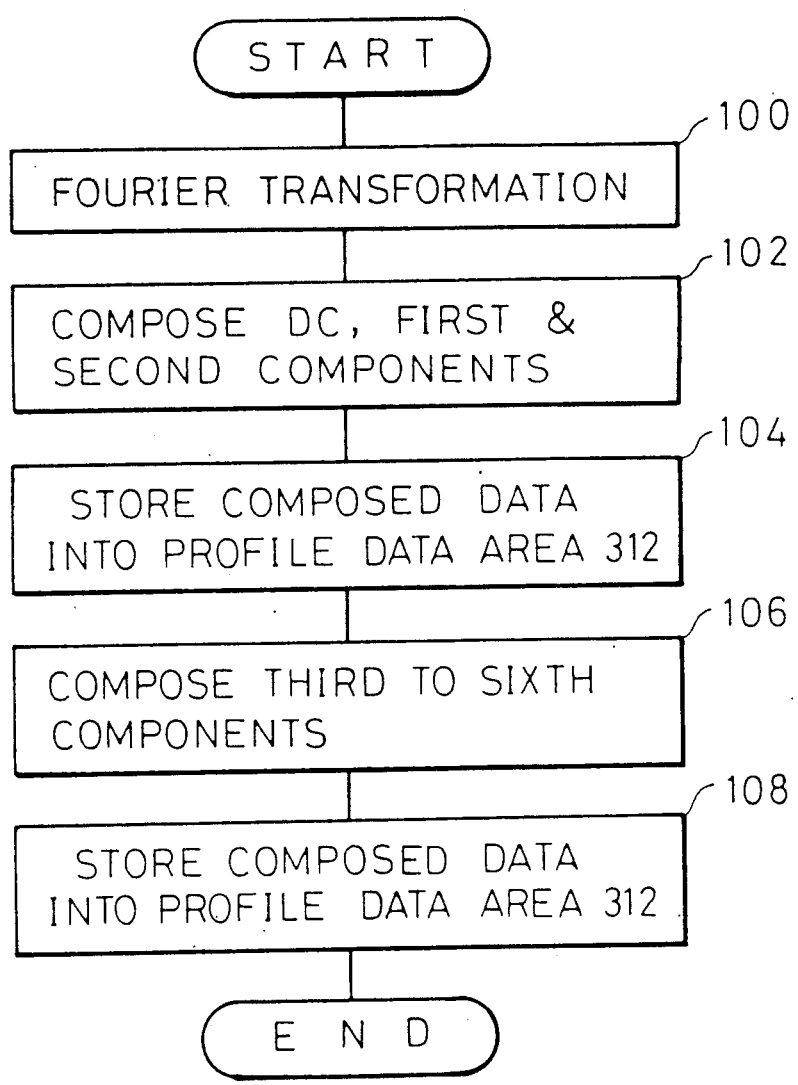
FIG. 6 is a flow chart illustrating a processing procedure of separating low frequency components and high frequency components of profile data by means of a CPU of the apparatus shown in FIG. 2.
Figure 7:
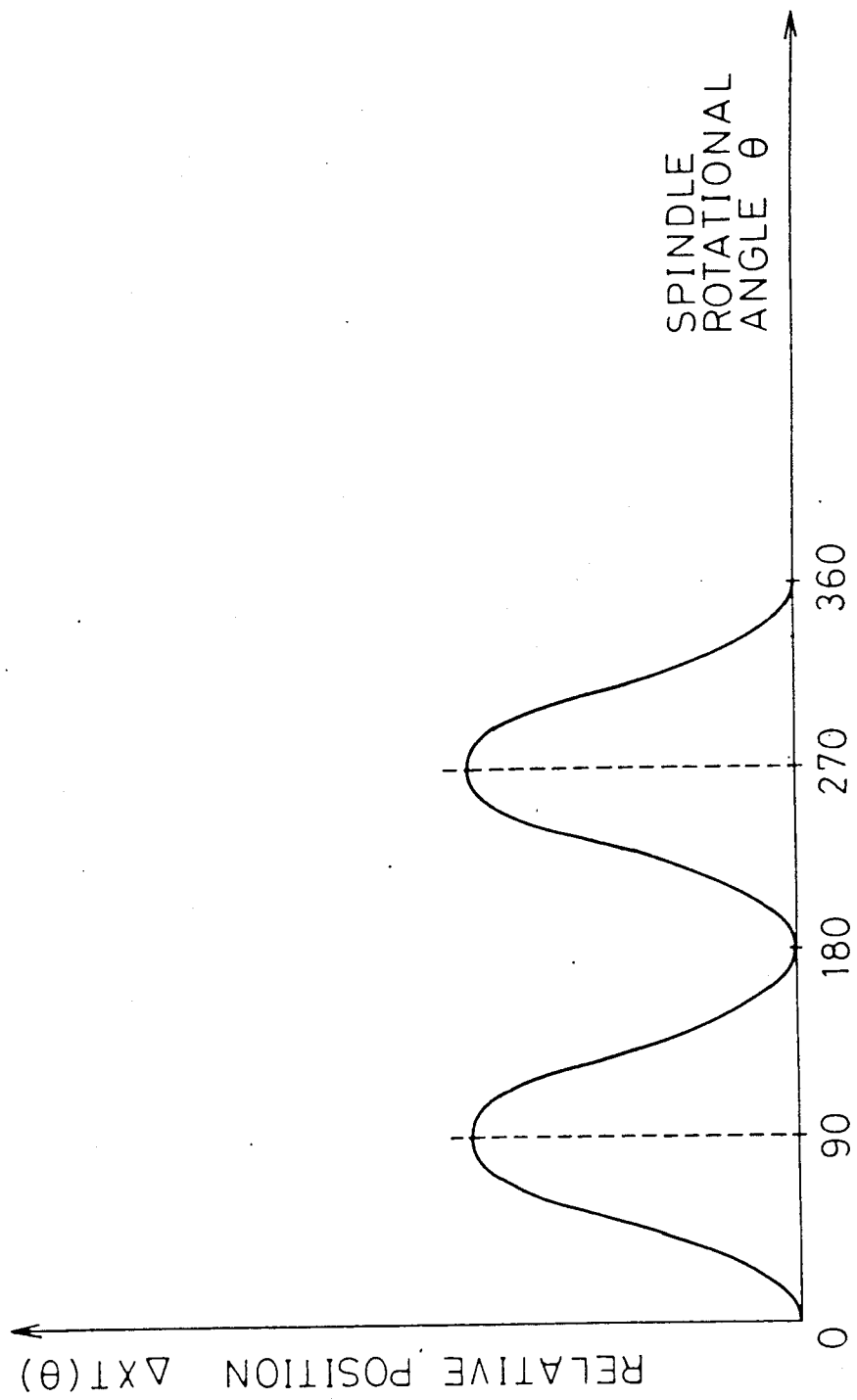
FIG. 7 is a diagram showing a characteristic of profile data with respect to an angle of rotation of a spindle.

Subsequently, a method of separating profile data $\Delta XT(\theta)$ into profile data $\Delta XT_L(\theta)$ for the linear motor 3 and profile data $\Delta XT_P(\theta)$ for the piezoelectric actuator 1 will be described. Such separation is executed by the CPU 30. FIG. 6 illustrates a procedure of such separating process. Referring to FIG. 6, at first at step 100, Fourier transformation of profile data $\Delta XT(\theta)$ is executed. Where the workpiece W is a piston for an internal combustion engine, generally profile data $\Delta XT(\theta)$ is a function of a period $\pi$ as seen from FIG. 7. Accordingly, profile data $\Delta XT(\theta)$ is expanded into a Fourier series in such a manner as given by the following expression:

$$\Delta XT(\theta) = \sum_{n=0}^{\infty} a_n \cos(2n\theta - \phi_n) \tag{9}$$

The Fourier coefficient an and the initial phase $\phi_n$ of the expression (9) above are found out by Fourier transformation.

In the present embodiment, the expansion is made to n=6. Then, components for n=0 to n=2 are assigned to the linear motor 3 while components for n=3 to n=6 are assigned to the piezoelectric actuator 1. Accordingly, $$\Delta XT_L(\theta) = a\theta + a_2\cos(2\theta+\phi_2) + a_4\cos(4\theta+\phi_4) \quad (10)$$

$$\Delta XT_P(\theta) = a_6\cos(6\theta+\phi_6) + a_8\cos(8\theta+\phi_8) + a_{10}\cos(10\theta+\phi_{10}) + a_{12}\cos(12\theta+\phi_{12}) \quad (11)$$

Figure 8:
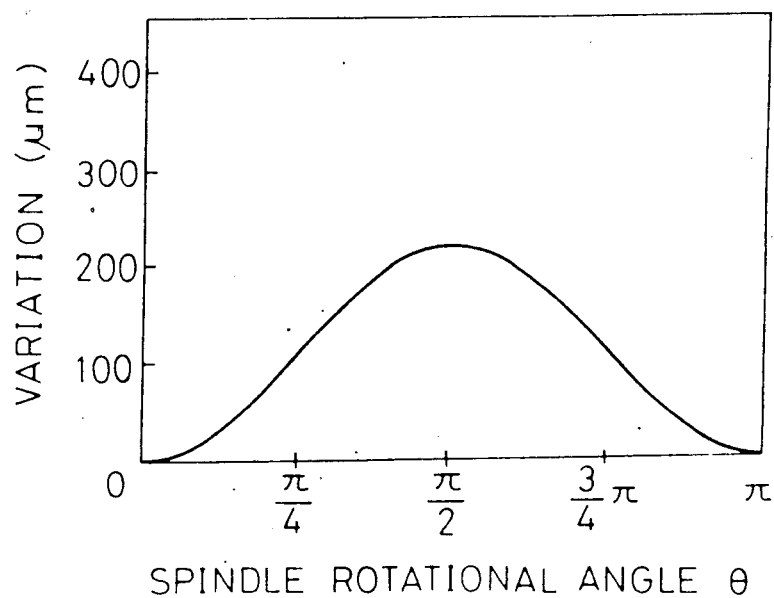
FIG. 8 is a diagram showing a variation of the composed value of separated low frequency components of the profile data.
Figure 9:
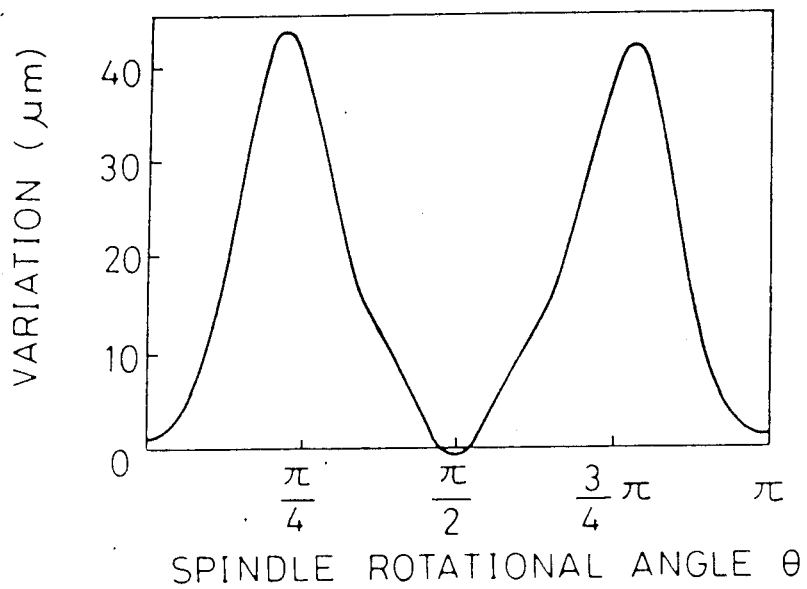
FIG. 9 is a diagram showing a variation of the composed value of separated high frequency components of the profile data.

Thus, at step 102, composition of the various components is executed in accordance with the expression (10) above to calculate profile data $\Delta XT_L(\theta)$ to be assigned to the linear motor 3. The profile data $\Delta XT_L(\theta)$ present such a variation as shown in FIG. 8. Then, the values $\Delta XT_L(\theta)$ are stored into the profile data area 312 of the RAM 31 at step 104. Then at step 106, composition of the various components is executed in accordance with the expression (11) above to calculate profile data $\Delta XT_P(\theta)$ to be assigned to the piezoelectric actuator 1. The profile data $\Delta XT_P(\theta)$ present such a variation as shown in FIG. 9. Then at step 108, the values $\Delta XT_P(\theta)$ are stored into the profile data area 312 of the RAM 31.

It is to be noted that, if the speed of rotation of the spindle 17 is represented by $\omega_{518}$, then the expressions (10) and (11) above can be individually represented as functions of time, setting $\theta = \omega_\phi t$.

In this manner, low frequency components of profile data are assigned to the linear motor 3 while high frequency components are assigned to the piezoelectric actuator 1.

Subsequently, a procedure of working is described. In working, the CPU 30 successively decodes NC data stored in the NC data area 312 of the RAM 31 and executes available processes in accordance with such a procedure of working as shown in FIG. 10.

Figure 10:
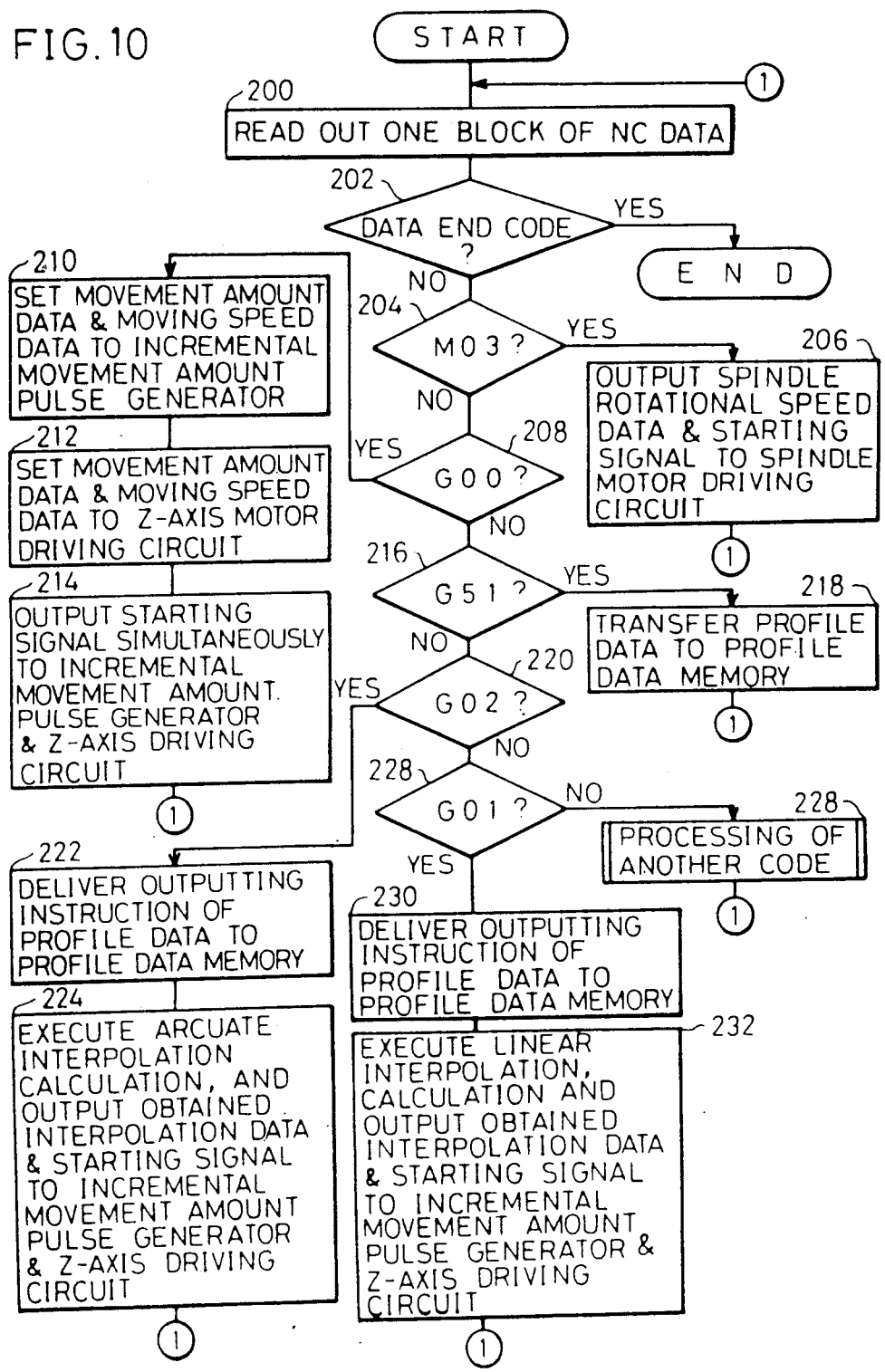
FIG. 10 is a flow chart illustrating a procedure of machining of a workpiece executed by the CPU shown in FIG. 2.
Figure 11:
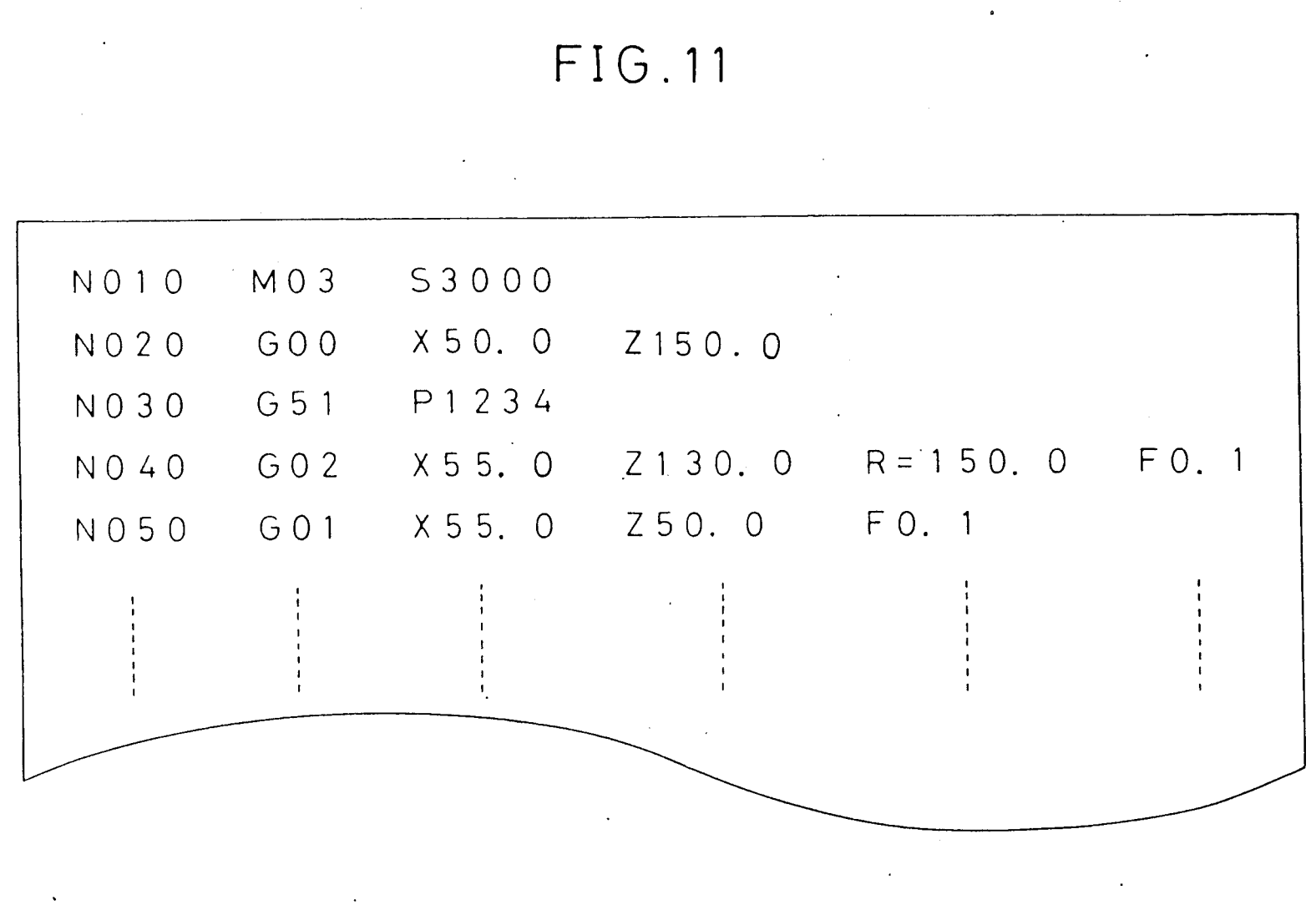

Referring to FIG. 10, at first at step 200, a first data block N010 of NC data illustrated in FIG. 11 is read out from the NC data area 312 of the RAM 31, and then at step 202, it is judged whether or not the NC data thus read out is a data end code. In case the NC data is not a data end code, the process of the CPU 30 advances to step 204 at which it is judged whether or not the NC data includes a code M03. Here, since the NC data N010 read out includes a code M03, the judgment at step 204 is YES, and consequently, the process advances to step 206 at which rotational speed data and a starting signal are delivered from the CPU 30 to the spindle motor driving circuit 35. Consequently, the spindle motor 19 is started and thus rotated at a designated speed of rotation of 3,000 rpm.

Then, the process of the CPU 30 returns to step 200 to read out a subsequent NC data block N020. Now, since a code of G00 is included in the NC data N020 as can be seen in FIG. 11, the judgment of step 208 is YES, and consequently, processes of step 210 and steps following the same are executed subsequently. At step 210, an amount and a speed of movement in the X-axis direction are calculated from the NC data N020, and calculated data of the same are set to the incremental movement amount pulse generator 51. Then at step 212, an amount and a speed of movement in the Z-axis direction are calculated from the NC data N020, and calculated data of the same are set to the Z axis motor driving circuit 34. Then at step 214, a starting signal is delivered to the incremental movement amount pulse generator 51 and the Z-axis motor driving circuit 34 while distribution of pulses is started at the same time so that the linear motor 3 and the Z-axis motor 18 are driven so that they may complete designated amounts of movement at a same point of time. As a result, the tool origin Ov is positioned to a position (X=50.0, Z=150.0) designated by the NC data N020.

Subsequently, the process of the CPU 30 returns to step 200 at which a subsequent NC data N030 is read out, and then processes at step 202 and steps following the same are executed subsequently. In this instance, the judgment at step 216 is YES, and consequently, the process of the CPU 30 advances to step 218 at which profile data $\Delta XT_L(\theta)$ and $\Delta XT_P(\theta)$ of a data number (P1234) designated by the NC data N030 are read out from the profile data area 312 of the RAM 31. Then, the profile data number (P1234) designated by the NC data N030 are read out from the profile data area 312 of the RAM 31. Then, the profile data $\Delta XT_L(\theta)$ is stored into the profile data memory 42 and the profile data $\Delta XT_P(\theta)$ is stored into the profile data memory 62.

Then, the process of the CPU 30 returns to step 200 at which a next NC data block N040 is read out. Consequently, the judgment at step 220 is YES, and the process advances to step 222 at which an instruction is delivered to the profile data memories 42 and 62 to output profile data in synchronism with a spindle synchronization signal which is developed by the rotary encoder 21 for detecting an angle of rotation of the spindle 17. As a result, the linear motor 3 and the piezoelectric actuator 1 are controlled in a synchronized relationship with rotation of the spindle 17 so that the tool end TP is moved along a locus provided by a combination of loci of movement by the linear motor 3 and the piezoelectric actuator 1. In particular, the tool end TP is moved in accordance with profile data $\Delta XT(\theta)$ which is obtained by a combination of the profile data $\Delta XT_L(\Delta)$ and the profile data $\Delta XT_P(\theta)$. As a result, the workpiece W is machined so that the section thereof perpendicular to the Z-axis may have a predetermined profile.

Subsequently at step 224, interpolation data are calculated by circular interpolation designated by the NC data N040 and set to the incremental movement amount pulse generator 51 and the Z-axis motor driving circuit 36, and then a starting signal is delivered to the two circuits 51 and 36. As a result, the reference point PS for the profile movement is moved simultaneously in the X-axis direction and the Z-axis direction based on circular interpolation. The locus of the tool head TP thus moves in the X-axis direction and the Z-axis direction while making profile movement. Consequently, the profile of the section of the workpiece W in a plane including the X-axis and Z-axis makes a predetermined arc.

Subsequently, the process of the CPU 30 returns to step 200 at which a next NC data N050 is read out, and then processes of step 202 and steps following the same are executed subsequently. Since a code of G01 is included in the NC data N050, the judgment at step 228 is YES, and consequently a process at step 230 is executed subsequently. At step 230, an instruction is delivered, similarly as at step 222, to the profile data memories 42 and 62 to output their profile data. In this instance, since outputting of data has been instructed already at step 222, the tool end TP only continues its profile movement. Subsequently at step 232, data for moving the reference point PS from the current position to the final position (X=55.0, Z=50.0) based on linear interpolation are delivered to the incremental movement amount pulse generator 51 and the Z-axis motor driving circuit 36. Consequently, the reference point PS for the profile movement is moved along a predetermined linear line in the X-axis direction and Z-axis direction.

In this manner, the piston is shaped which has an elliptic section perpendicular to the Z-axis and has a barrel-like shape along the Z-axis.

Figure 12:
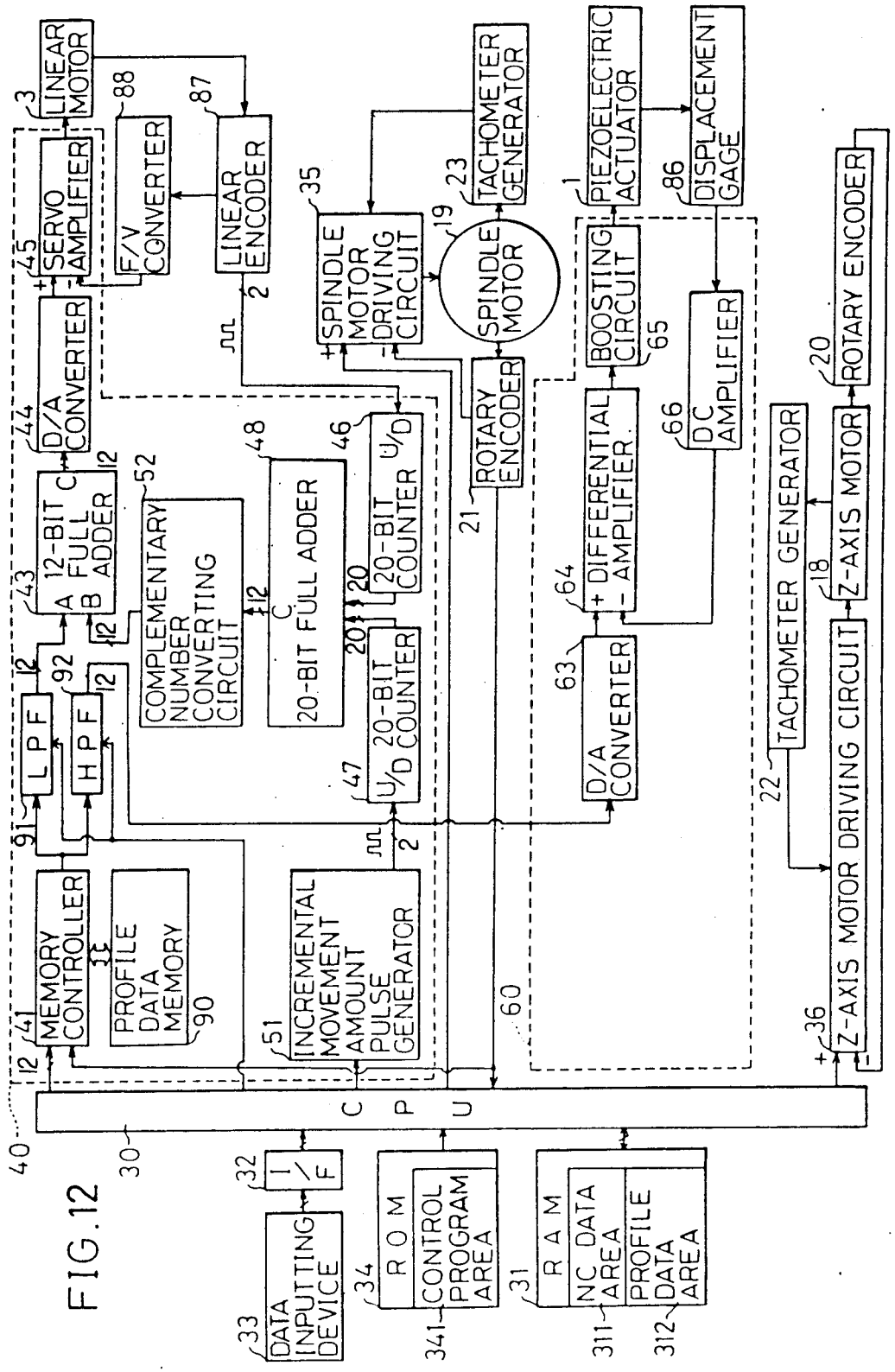
FIG. 12 is a block diagram showing an electric construction of a non-circular workpiece machining apparatus according to another preferred embodiment of the present invention.
Figure 13:
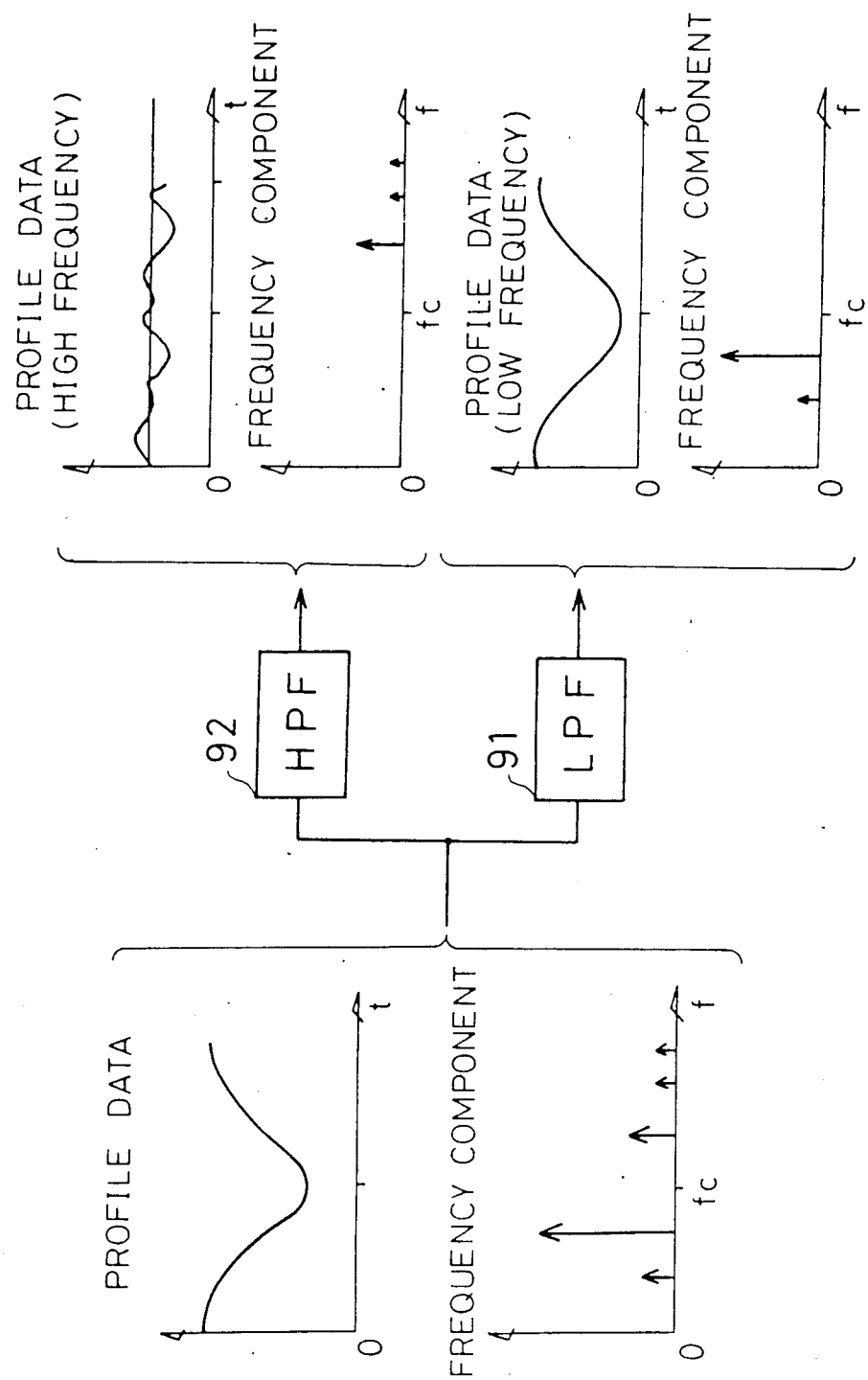
FIG. 13 is a diagrammatic representation illustrating a concept of separation of profile data into low frequency components and high frequency components by the non-circular workpiece machining apparatus of FIG. 12.
Figure 14B:
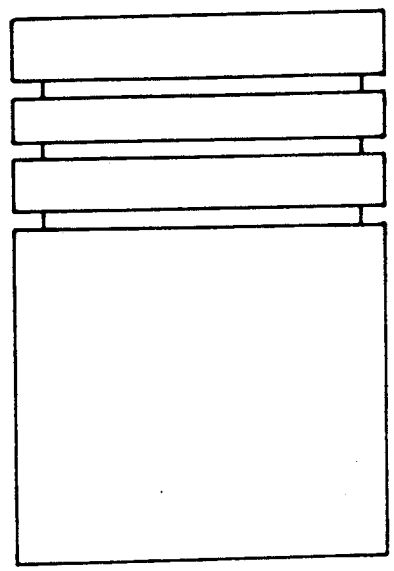
FIGS. 14A and 14B are a top plan view and a front elevational view, respectively, of a piston as an example of workpiece to be machined on a non-circular workpiece machining apparatus.
Figure 14A:
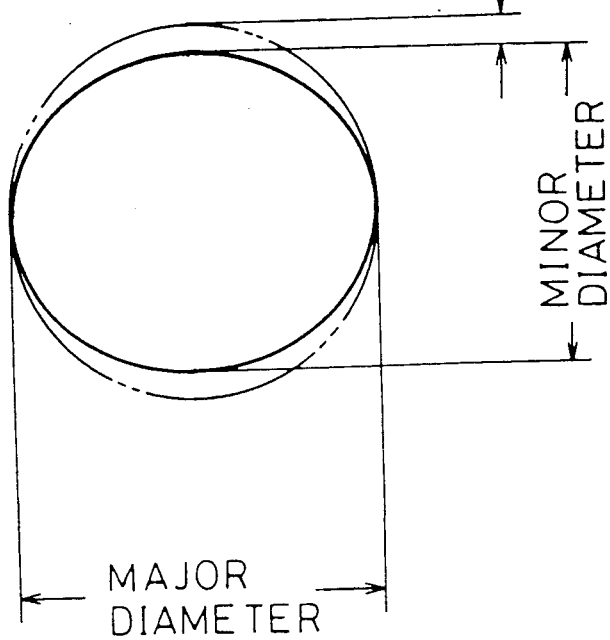

Referring now to FIG. 12, there is shown an electric construction of a non-circular workpiece machining apparatus according to another preferred embodiment of the present invention. The non-circular workpiece machining apparatus is a modification to the non-circular workpiece machining apparatus of the preceding embodiment and includes a single profile data memory 90 which corresponds to the profile data memories 42 and 62 shown in FIG. 3. Output of the profile data memory 90 is coupled to a digital low-pass filter (LPF) 91 and a digital high-pass filter (HPF) 92 by way of a memory controller 41. Output of the digital low-pass filter 91 is coupled to a terminal A of a full adder 43 while output of the digital high-pass filter 92 is coupled to a digital to analog (D/A) converter 63. The profile data memory 90 has stored therein profile data $\Delta XT(\theta)$ which are determined from a shape of a workpiece. The profile data $\Delta XT(\theta)$ are read out in synchronism to rotation of the spindle 17 and separated into low frequency components and high frequency components as illustrated in FIG. 13 by the digital low-pass filter 91 and the digital high-pass filter 92, respectively.

While low frequency components and high frequency components are separated from each other by the CPU 30 in the non-circular workpiece machining apparatus of the preceding embodiment, such separation is executed by the digital filters 91 and 92 in the non-circular workpiece machining apparatus of the present embodiment in this manner, and consequently, the burden to the CPU 30 is reduced while high speed working is facilitated. It is to be noted that the cutoff frequencies of the filters 91 and 92 can be set from the CPU 30.

We claim:

1. An apparatus for machining a non-circular workpiece wherein a spindle to which a workpiece is attached is rotated while a tool is moved back and forth in a direction perpendicular to the axis of said spindle to machine the workpiece so as to have a desired non-circular sectional shape, comprising:

a tool mount member disposed for movement in the direction perpendicular to the axis of said spindle;

a tool support means for supporting said tool on said tool mount member for reciprocating movement in the same moving direction as that of said tool mount member;

a high speed actuator placed on said tool mount member for moving said tool back and forth at a high speed with respect to said tool mount member;

a motor for moving said tool mount member back and forth in the direction perpendicular to the axis of said spindle;

a first control means for actuating said motor, in a synchronized relationship with the rotation of said spindle, in accordance with data indicating low frequency components of profile data calculated from said desired non-circular sectional shape so that said tool mount member is moved to produce a first movement corresponding to said low frequency components of said profile data; and a second control means for actuating said high speed actuator, in a synchronized relationship with the rotation of said spindle, in accordance with data indicating high frequency components of said profile data so that said tool is moved relative to said tool mount member to produce a second movement corresponding to said high frequency components of said profile data, said tool being moved by a composite movement composed of said first movement of said tool mount member and said second movement of said tool relative to said tool mount member to produce a movement corresponding to said profile data.

2. An apparatus for machining a non-circular workpiece according to claim 1, wherein said high speed actuator is a piezoelectric actuator while said motor is a linear motor.

3. An apparatus for machining a non-circular workpiece according to claim 1, wherein said first control means includes a memory for storing therein said low frequency components of said profile data which define a position of said tool in the direction perpendicular to the axis of said spindle with regard to an angle of rotation of said spindle, and a memory controller for successively outputting said low frequency components of said profile data stored in said memory as aimed control values for said motor in a synchronized relationship with a spindle synchronization signal which is developed upon each rotation of said spindle by a single unit.

4. An apparatus for machining a non-circular workpiece according to claim 1, wherein said second control means includes a memory for storing therein said high frequency components of said profile data which define a position of said tool in the direction perpendicular to the axis of said spindle with regard to an angle of rotation of said spindle, and a memory controller for successively outputting said high frequency components of said profile data stored in said memory as aimed control values for said high speed actuator in a synchronized relationship with a spindle synchronization signal which is developed upon each rotation of said spindle by a unit angle.

5. An apparatus for machining a non-circular workpiece according to claim 1, wherein said first control means includes a memory for storing therein said low frequency components of said profile data which define a position of said tool in the direction perpendicular to the axis of said spindle with regard to an angle of rotation of said spindle, a memory controller for successively outputting said low frequency components of said profile data stored in said memory as aimed control values for said motor in a synchronized relationship with a spindle synchronization signal which is developed upon each rotation of said spindle by a unit angle, a reference position developing means for developing reference position data for varying a reference position of said tool for back and forth movement which is performed in accordance with said profile data.

a difference calculating circuit for calculating a difference between the reference position data developed from said reference position developing means and detected current position data of said motor, an error circuit for calculating a positioning error in response to output data of said difference calculating circuit and said profile data outputted from said memory, and a speed controlling circuit for controlling the speed of rotation of said motor in response to an output of said error circuit.

6. An apparatus for machining a non-circular workpiece wherein a spindle to which a workpiece is attached is rotated while a tool is moved back and forth in a direction perpendicular to the axis of said spindle to machine the workpiece so as to have a desired non-circular sectional shape, comprising:

a tool mount member disposed for movement in a direction perpendicular to the axis of said spindle;

a tool support means for supporting said tool on said tool mount member for reciprocating movement in the same moving direction as that of said tool mount member;

a high speed actuator placed on said tool mount member for moving said tool back and forth at a high speed with respect to said tool mount member;

a motor for moving said tool mount member back and forth in the direction perpendicular to the axis of said spindle;

a profile data storage means for storing therein profile data which are calculated from said desired non-circular sectional shape and define a position of said tool in a direction perpendicular to the axis of said spindle with respect to an angle of rotation of said spindle;

a profile data separating means for separating said profile data into low frequency components and high frequency components;

a first control means for actuating said motor, in a synchronized relationship with the rotation of said spindle, in accordance with data indicating said low frequency components of said profile data separated by said profile data separating means so that said tool mount member is moved to produce a first movement corresponding to said low frequency components of said profile data; and a second control means for actuating said high speed actuator, in a synchronized relationship with the rotation of said spindle, in accordance with data indicating said high frequency components of said profile data separated by said profile data separating means so that said tool is moved relative to said tool mount member to produce a second movement corresponding to said high frequency components of said profile data, said tool being moved by a composite movement composed of said first movement of said tool mount member and said second movement of said tool relative to said tool mount member to produce a movement corresponding to said profile data.

7. An apparatus for machining a non-circular workpiece according to claim 6, wherein said profile data separating means includes a digital filter.

* * * * *